Dec. 24, 1957 H. W. HAPMAN 2,817,430
TIRE-DRIVEN CONVEYING APPARATUS
Filed Jan. 30, 1953 5 Sheets-Sheet 1

INVENTOR.
BY Henry W. Hapman
Barthel & Bugbee
Attys.

Dec. 24, 1957  H. W. HAPMAN  2,817,430
TIRE-DRIVEN CONVEYING APPARATUS
Filed Jan. 30, 1953  5 Sheets-Sheet 2
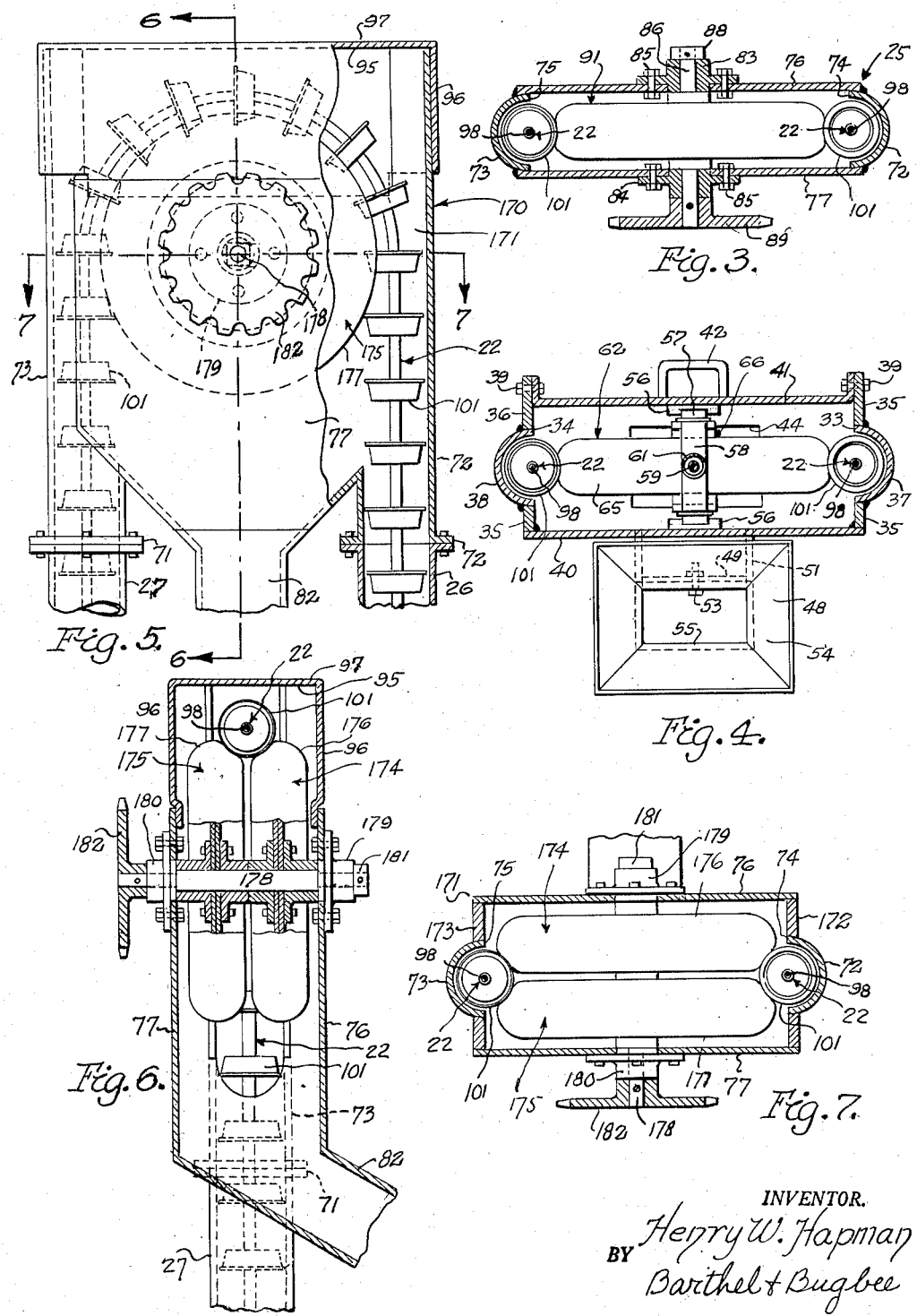
INVENTOR.
Henry W. Hapman
BY Barthel & Bugbee
Attys

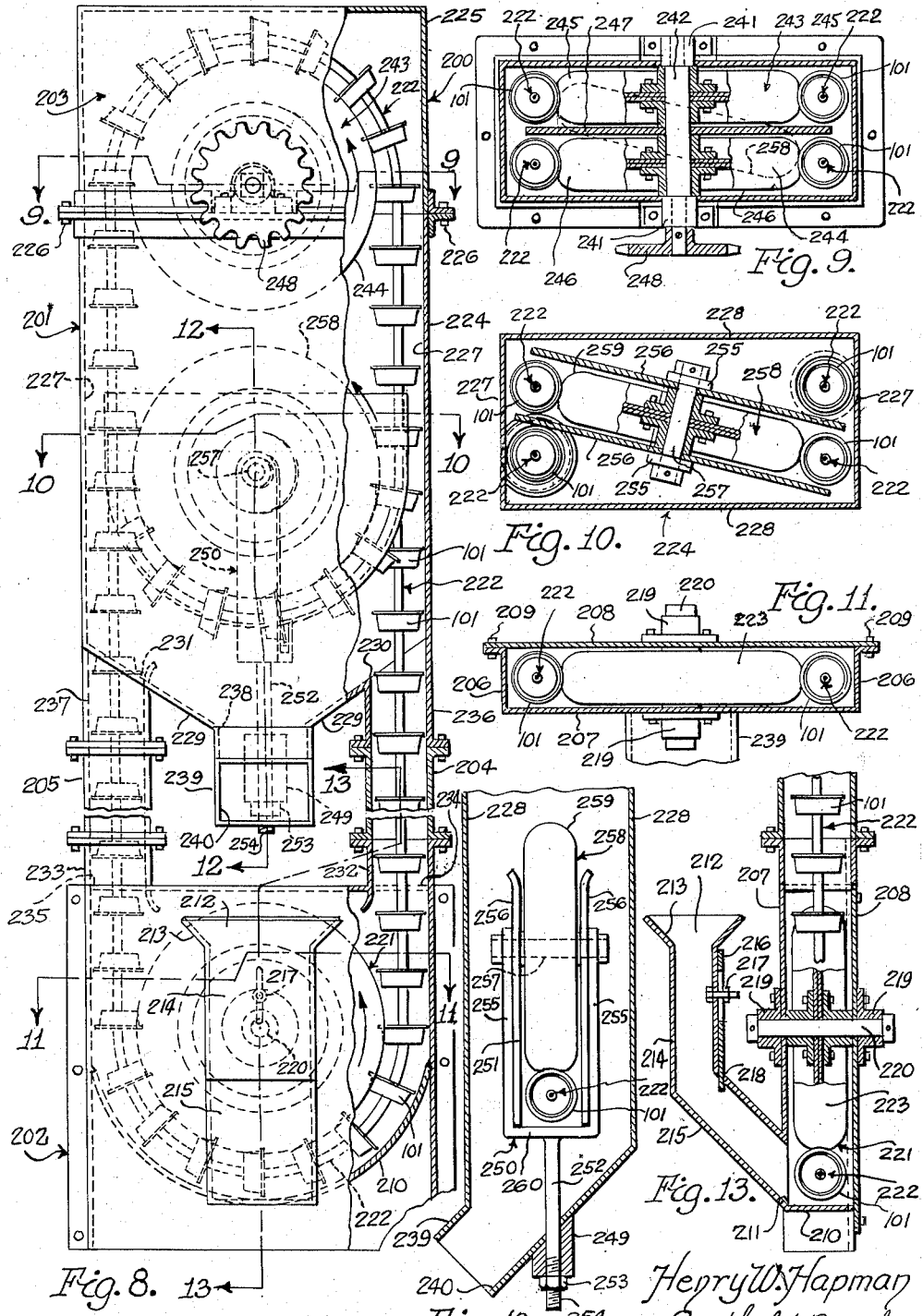

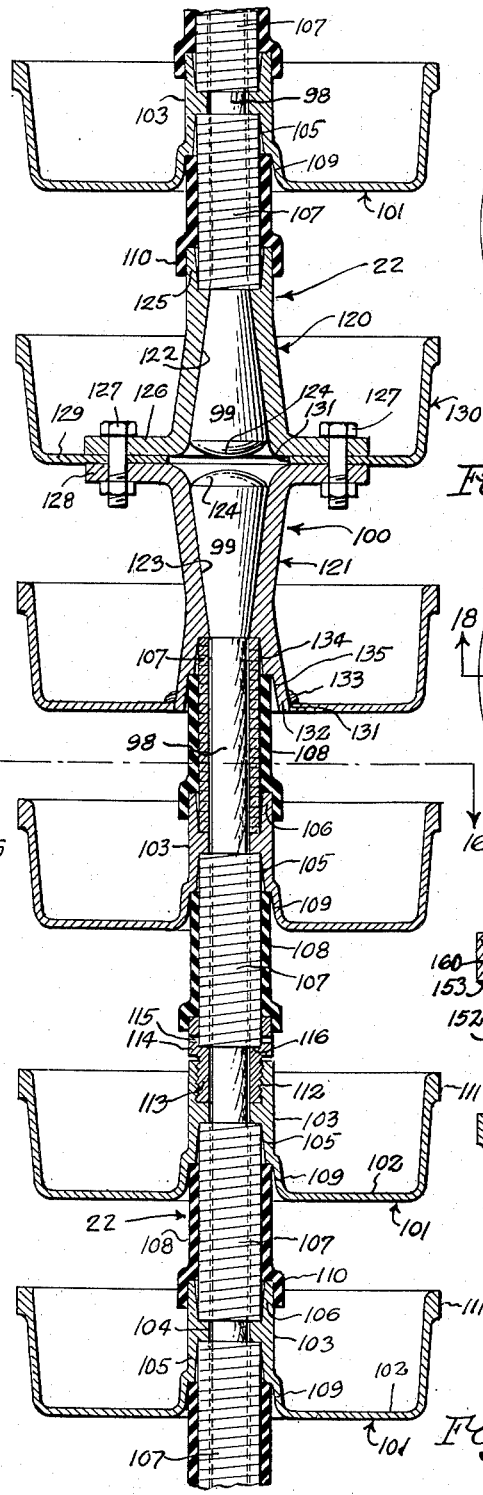

Dec. 24, 1957 H. W. HAPMAN 2,817,430
TIRE-DRIVEN CONVEYING APPARATUS
Filed Jan. 30, 1953 5 Sheets-Sheet 5
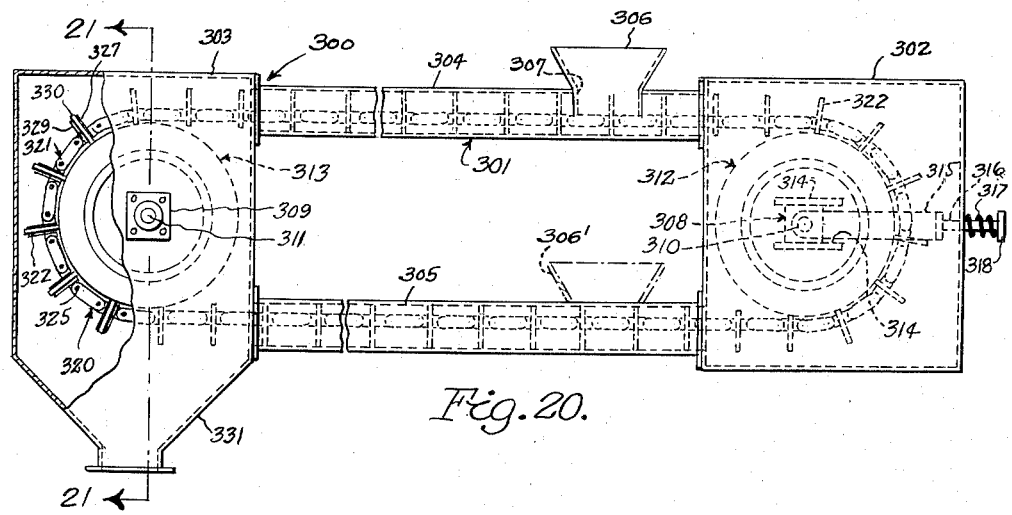
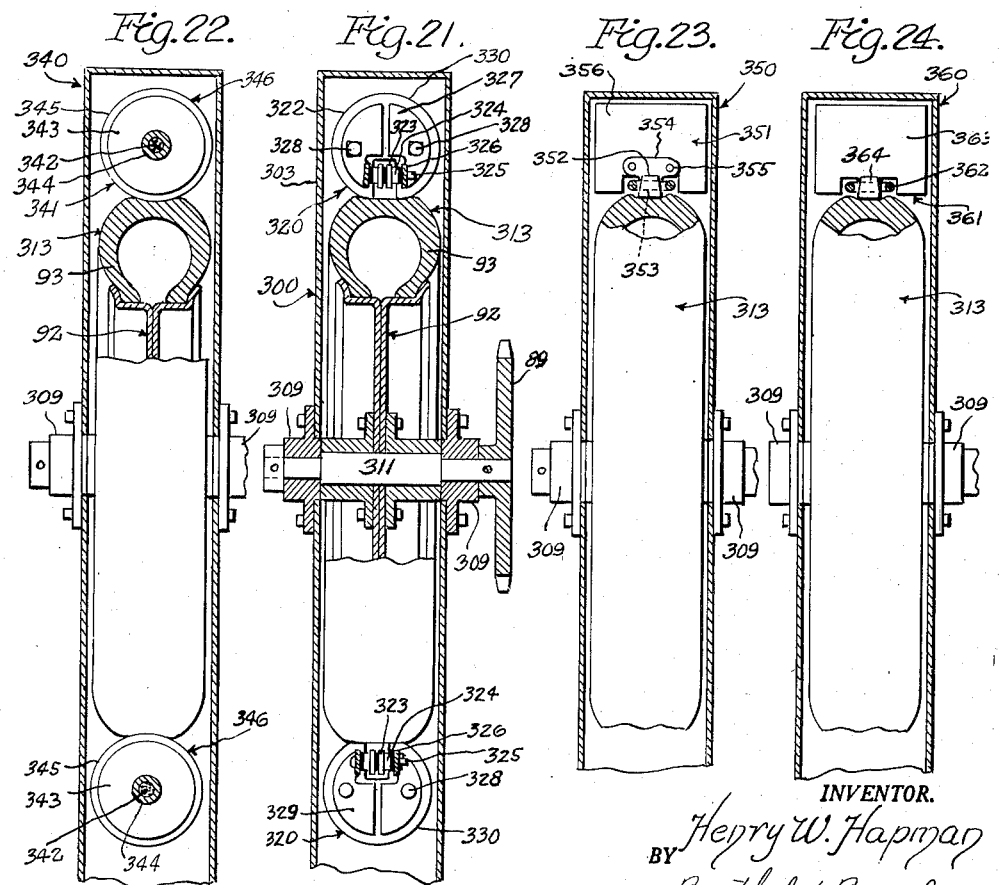
INVENTOR.
Henry W. Hapman
BY Barthel & Bugbee
Attys.

United States Patent Office 2,817,430
Patented Dec. 24, 1957

2,817,430

TIRE-DRIVEN CONVEYING APPARATUS

Henry W. Hapman, Hickory Corners, Mich., assignor of forty percent to Hannah Jane Hapman, Hickory Corners, Mich.; Melvin S. Huffaker and Hannah Jane Hapman, executors of said Henry W. Hapman, deceased Application January 30, 1953, Serial No. 334,309

5 Claims. (Cl. 198—140)

This invention relates to conveyors and, in particular, to endless flexible bucket or flight conveyors.

One object of this invention is to provide an endless flexible conveyor for transferring material from one location to another either vertically or horizontally and having an endless flexible connector, such as a cable or chain, carrying spaced buckets or flights driven by a rotary resilient driving wheel which it at least partially encircles, the wheel preferably having a pneumatic or otherwise resilient tire thereon, thereby enabling a higher speed of conveying to be obtained with less slippage than in prior conveyors.

Another object is to provide an endless flexible conveyor of the foregoing character wherein high speed of operation is not hindered by stretching of cables or the necessity of meshing chains with sprockets, such sprockets or other mechanical elements previously used and requiring accurately maintaining the spacing of the buckets or flights being eliminated in the present conveyor, and no such intermeshing or interlinking occurring.

Another object is to provide an endless flexible conveyor of the foregoing character wherein the pneumatic or other resilient rubber tire drive of the conveyor enables the air pressure within the tire to be adjusted to the load to be carried by the particular installation, hence adapting the conveyor to the weight of the materials being conveyed, as well as insuring a positive driving engagement therebetween together with a cushioning action which reduces noise, vibration, and wear and consequently increases the working life of the apparatus.

Another object is to provide an endless flexible conveyor of the foregoing character which, by reason of its simplicity of construction, costs less to manufacture initially, also costs less to maintain, and is easier to assemble, since the inflated tire on the driving wheel is capable of yielding in order to receive the assembly of the conveyor buckets and endless flexible connector, in contrast to the unyieldable sprockets and chains previously used with such conveyors.

Another object is to provide a modified endless flexible conveyor for heavy duty conveying wherein the conveyor is driven by a pair of resilient parallel driving wheels, preferably coaxial and preferably equipped with pneumatic tires, so that the driving and weight-sustaining load is distributed between the two wheels and an increased driving engagement is obtained between the wheels and the conveyor buckets or flights, thereby resulting in increased efficiency and decreased cost of conveying.

Another object is to provide a further modified endless flexible bucket or flight conveyor having an improved means for taking up slack or adjusting the tension of the flexible connector and bucket or flight assembly.

Another object is to provide a bucket conveyor elevator of the foregoing character which is free from the drag of material and high pressures developed against the walls of a conveyor conduit by a disc flight conveyor, thereby enabling the present bucket conveyor elevator to lift materials higher and faster than can be lifted by a flight conveyor.

Another object is to provide a bucket conveyor elevator of the foregoing character wherein the buckets are free to rotate on the endless flexible connector, thereby distributing the wear around the periphery of each bucket and consequently decreasing maintenance and increasing the life of the conveyor.

Another object is to provide a bucket conveyor elevator of the foregoing character wherein the materials can be loaded at the very bottom of the conveyor without requiring the trench needed in prior bucket conveyor elevators for take-up purposes, the pneumatic tire on the lower wheel of the present conveyor yielding so as to prevent jamming of the conveyor by unyieldable foreign matter, such as pieces of rock.

Another object is to provide a bucket conveyor elevator of the foregoing character wherein the vertically-disposed conveyor conduits also serve as tubular structural members for supporting the apparatus, thereby further simplifying the apparatus and reducing its cost of manufacture.

Another object is to provide a modified conveyor bucket for heavy duty purposes wherein the weight or load is carried by a spider secured to the endless flexible connector and carrying the annular bucket pan.

Another object is to provide a further modified conveyor bucket having a conical bottom wall adapted to deflect material falling thereon when it is traveling downward on its return course, thereby preventing the collection or transporting of material on the bottoms of the inverted buckets.

Another object is to provide a bucket conveyor elevator of the foregoing character wherein the opposite ends of the flexible connector are joined by a combination bucket, cable splice and coupling, eliminating all fastenings except at the coupling point between the coupled buckets, thereby increasing the life of the cable as compared with the shortened lives of prior bucket conveyor elevators employing fasteners engaging the cables and dividing up the cable into short sections of lessened flexibility.

Other objects and advantages of the invention will become apparent during the course of the following description of the accompanying drawings, wherein:

Figure 3 is a horizontal section taken along the line 3—3 in Figure 1;

Figure 4 is a horizontal section taken along the line 4—4 in Figure 1;

Figure 5 is a side elevation, partly broken away, and in vertical section, of the upper portion of a modified bucket conveyor elevator for heavy duty, according to the invention;

Figure 6 is a vertical section taken along the line 6—6 in Figure 5;

Figure 7 is a horizontal section taken along the line 7—7 in Figure 5;

Figure 8 is a side elevation, partly broken away and in vertical section, of a still further modified bucket conveyor elevator for heavy duty with improved means of slack take-up, according to the invention, the central portion also being omitted for compactness of showing;

Figure 9 is a horizontal section taken along the line 9—9 in Figure 8;

Figure 10 is a horizontal section taken along the line 10—10 in Figure 8;

Figure 11 is a horizontal section taken along the line 11—11 in Figure 8;

Figure 12 is a vertical section taken along the line 12—12 in Figure 8;

Figure 13 is a vertical section taken along the line 13—13 in Figure 8;

Figure 15 is an enlarged central longitudinal section through the conveyor bucket and cable assembly, showing the improved cable coupling according to the invention;

Figure 16 is a cross-section taken along the line 16—16 in Figure 15;

Figure 17 is a top plan view of a modified heavy duty bucket for the conveyor shown in Figure 15;

Figure 18 is a longitudinal section taken along the line 18—18 in Figure 17;

Figure 19 is a longitudinal section through a further modified conveyor bucket having a conical material-deflecting bottom wall;

Figure 20 is a side elevation, partly broken away in vertical section, of a modified tire-driven conveyor in a horizontal installation, according to a further form of the invention, the central portion being likewise omitted for compactness of showing, and an optional position of the feeding or supply hopper being shown in dotted lines;

Figure 21 is a vertical cross-section taken along the line 21—21 in Figure 20;

Figure 22 is a vertical cross-section similar to Figure 21, but showing a modification in which the conveyor is a cable-mounted disc conveyor;

Figures 1, 2, 14:
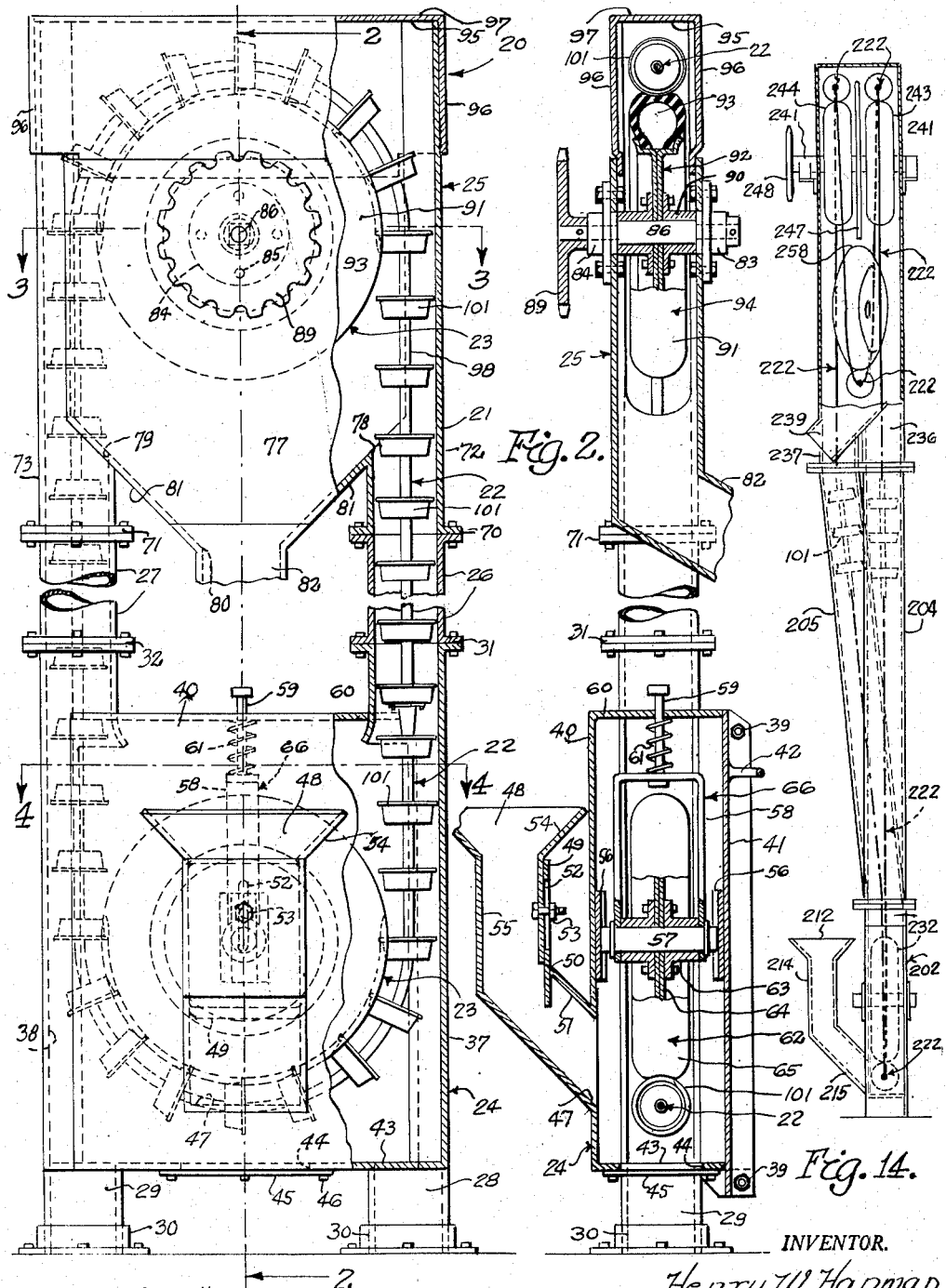
Figure 1 is a side elevation, partly broken away in vertical section, of a bucket conveyor elevator according to one form of the invention, the central portion being omitted for compactness of showing.
Figure 2 is a central vertical section taken along the line 2—2 in Figure 1.
Figure 14 is a diagrammatic side elevation, partly broken away, of the further modified flight conveyor of Figure 8, taken at right angles to Figure 8 and showing the path of travel of the endless flexible connector of the conveyor.

Figure 23 is a vertical cross-section similar to Figure 21, but showing a further modification in which the conveyor is a chain-mounted flight conveyor having flight plates attached to lugs on the chain links; and Figure 24 is a vertical cross-section similar to Figure 21, but showing a still further modification in which the conveyor is a chain-mounted flight conveyor wherein the flights are integral with certain links of the chain.

*General description of the invention*

Described in purely general and concise terms, the invention consists of a pair of longitudinally-spaced housings interconnected by a pair of laterally-spaced vertical conduits in which travels an endless flexible connector, such as a cable or chain, equipped with a multiplicity of longitudinally-spaced buckets or flights. These housing contain resilient-rimmed wheels around which an endless flexible conveyor assembly is trained, these wheels preferably having inflatable pneumatic tires thereon which not only absorb shocks and vibration, but which also effect a driving connection between a driving motor (not shown) and one of the wheels, preferably the upper wheel. One housing is provided with an intake or loading hopper and the other housing with an outlet or discharge spout, these housings constituting the means by which the conveyed material is delivered to and discharged from the apparatus respectively. One wheel is preferably mounted on a resiliently-supported frame or yoke, thereby providing automatic take-up of slack in the endless flexible connector and bucket or flight unit.

Figures 1 to 4 inclusive show the invention applied to a light-duty bucket conveyor of this character supported by a pair of vertically-spaced single pneumatic tired wheels, Figures 5 to 7 inclusive show the invention applied to a medium-duty bucket conveyor of this character supported by a pair of vertically-spaced double pneumatic tired wheels, Figures 8 to 14 inclusive show a heavy-duty bucket conveyor modification of Figures 5 to 7 inclusive in which a third pneumatic-tired wheel constituting a self-centering slack-takeup wheel, is provided intermediate the upper and lower wheels and in which the conveyor makes two passes in unloading, thereby greatly reducing carryover of material. The cup-shaped buckets are centrally mounted upon an endless flexible cable as shown in Figures 15 and 16, with tightly wound helical springs between the hub of the bucket and the cable, the springs in turn being covered by tubular resilient members of elastic deformable material such as rubber or synthetic rubber.

At intervals of approximately 50 feet, depending upon the particular installation, the lengths of cable are coupled to one another in the manner shown in the upper portion of Figure 15, thereby eliminating the necessity of applying fasteners directly to the cable and consequently lengthening the working life of the latter. Due to the driving arrangement employing the pneumatic-tired wheel, no sprockets are needed and consequently, even if the endless flexible connector cable stretches, no harm is done and no exact spacing of the buckets is necessary because the pneumatic-tired wheels automatically receive the buckets regardless of their spacing upon the cable. Figures 17 and 18 show a heavy duty bucket wherein the bucket is supported and connected to the cable by a wheel-like structure roughly resembling an automobile steering wheel, the bucket pan itself being welded to this wheel or spider. The further modified bucket of Figure 19 is similar to those shown in Figure 15, but has a conical bottom rather than a flat bottom in order to deflect material falling thereon while the bucket is descending on its return course.

Figures 20 and 21 show the invention as applied to a horizontal endless flexible conveyor installation, the endless flexible conveyor being a chain-mounted flight conveyor driven and supported by the resilient-rimmed wheel mechanism of the invention. Figures 22, 23 and 24 are slight modifications of Figure 21 wherein the endless flexible conveyor is a flight conveyor with the flights mounted on a cable (Figure 22) or attached to lugs on the links of a chain (Figure 23) or integral with such links (Figure 24).

*Single driving wheel bucket conveyor*

Referring to the drawings in detail, Figures 1 to 4 inclusive show a single driving wheel endless flexible bucket conveyor installation, generally designated 20, according to one form of the invention, as consisting generally of a housing and conduit structure 21 containing an endless flexible bucket conveyor unit 22 carried by supporting and driving mechanism, generally designated 23. The housing and conduit structure 21 consists of a lower housing structure, generally designated 24, and an upper housing structure 25 interconnected by forward and return conduit portions 26 and 27 respectively. The lower conduit structure 24 includes forward and return conduit portions 28 and 29 respectively (Figure 1) supported at their lower ends on flanged bases 30 and rising therefrom to the lower ends of the conduit portions 26 and 27, as at the flanged portions 31 and 32 respectively. The conduit portions 28 and 29 for a substantial portion of their length are cut away at approximately one half of their diameters, as at their edges 33 and 34 respectively (Figure 4). The opposite housing end walls 35 and 36 including the semi-cylindrical portions 37 and 38 welded thereto at the edges 33 and 34 are either welded to one of the side walls 40 or bolted as at 39 to the other side wall 41. In this manner, the lower conduit portions 28 and 29 serve not only to form portions of the lower housing structure 24, but also serve as structural supports therefor.

The side wall 41 has a handle 42 welded or otherwise secured thereto (Figure 4) by which it can be removed to give access to the interior of the lower housing structure 24, and the latter is provided in its bottom wall 43 with an access opening 44 closed by a closure plate 45 bolted or otherwise secured thereto as at 46. The side wall 40 is provided with an entrance opening 47 (Figure 2) to which the lower end of a loading or intake hopper 48 is secured, as by welding, a damper 49 being slidably mounted in a slot 50 in the lower hopper portion 51 in order to control the rate of flow of material entering the conveyor housing structure 24. The damper 49 is slotted as at 52 for adjustment purposes, and is locked in its adjusted position by a clamping bolt 53 (Figure 2). The intake hopper 48 is provided with a flared top 54 connected to the downwardly-inclined lower hopper portion 51 by a vertical hopper portion 55, on which the damper 49 is mounted.

Secured as by welding to the inner surfaces of the opposite side walls 40 and 41 (Figures 2 and 4) are vertically-grooved bearing blocks 56 in which a lower axle or shaft 57 is rotatably and slidably mounted. Secured to and carrying the axle 57 (Figure 2) is a fork or yoke 58 bored at its lower ends to rotatably receive the axle 57 and carrying a headed rod 59 at its upper end or bridge portion. The rod 59 passes through the top wall 60 of the lower housing structure 24 and is encircled by a helical compression spring 61 so as to provide a resilient mounting for a lower or conveyor supporting wheel 62 having a hub 63 rotatably mounted upon the axle 57 between the arms of the fork or yoke 58. The wheel hub 63 carries a disc and rim portion 64 which in turn carries an inflated pneumatic tire 65 of approximately toroidal shape. The yoke 58, wheel 62 and its accompanying elements 57 and 56 together form the conveyor supporting unit, generally designated 66, forming the lower half of the supporting and driving mechanism 23.

The forward and return conduit portions 26 and 27 at their upper ends are secured at the flanged connections 70 and 71 to the upper conduit portions 72 and 73 (Figure 1) which, like the lower conduit portions 37 and 38, are cut away diametrically along the edges 74 and 75 respectively (Figure 3) so as to form end walls for the upper housing structure 25. The side walls 76 and 77 of the upper housing structure 25 are welded or otherwise secured to the conduit portions 72 and 73 adjacent their respective edges 74 and 75 and extend downwardly to conduit openings 78 and 79 and a central discharge opening 80 toward which the bottom walls 81 of the upper conduit structure 25 are inclined downwardly. A laterally-inclined discharge spout 82 is secured at its upper end to the housing structure 25 at the opening 80, as by welding.

The side walls 76 and 77 of the upper housing structure 25 (Figure 3) are bored to receive aligned journal bearings 83 and 84 respectively, bolted thereto as at 85 and rotatably supporting the drive shaft 86, the central portion of which is squared (Figure 1). To one end of the shaft 86 is secured a collar 88 and to the other end a drive sprocket 89 (Figure 3). The drive sprocket 89 is connected by a conventional drive chain (not shown) to a suitable source of power, such as an electric motor, through suitable conventional reduction gearing or other equivalent speed reduction mechanism (not shown).

Fixedly mounted on the squared central portion of the drive shaft 86 is a hub 90 of a conveyor driving wheel, generally designated 91. The driving wheel 91, like the supporting wheel 62, is provided with a disc and rim structure 92 of similar construction bolted or riveted thereto and carrying a pneumatic tire 93 also of approximately toroid shape. The pneumatic tire 93 (Figure 2) may be provided with the usual inflatable inner tube or it may be directly inflated, the tube being omitted to simplify the showing. The wheel 91, drive shaft 86 and journal bearings 83 and 84 together constitute the conveyor driving unit or upper conveyor supporting unit, generally designated 94 and constituting the upper half of the supporting and driving mechanism 23. The upper housing structure 25 is open at the top, and is closed by a removable cover 95 having overlapping sides 96 extending downwardly from its top wall 97. The endless flexible bucket conveyor unit 22 is trained around the upper and lower wheels 91 and 92 and snugly engages their respective pneumatic tires 93 and 65 to receive driving and supporting engagement therefrom.

*Endless flexible bucket conveyor unit*

The conveyor unit 22 (Figures 15 and 16) consists of a flexible cable or other flexible connector 98 formed of any suitable material such as stranded steel wires (Figure 15) and terminating in conical or bulbous enlargements 99 forming portions of a coupling, generally designated 100.

Mounted at intervals along the cable 98 are conveyor buckets, generally designated 101, each consisting of an annular or circular cup or pan 102 connected at its central portions to a tubular hub 103 having a central bore 104 terminating at its opposite ends in flared sockets 105 and 106 respectively. The sockets 105 and 106 serve to receive the ends of tightly wound helical springs 107 preferably of square cross-section, and serving as power-transmitting members between adjacent buckets 101. The springs 107 are loosely mounted on the cable 98 so as to be capable of moving axially relatively thereto, and in turn are covered by tubular cover members 108 of elastic deformable material such as natural or synthetic rubber. The upper end of each tubular cover 108 is seated in a counterbore 109 in the bottom of the bucket hub 103 adjacent the lower socket 105, whereas the lower end thereof is stretched over the upper end of the hub 103, as at 110, thereby sealing the spring 107 from contact with any grit, foreign matter, or conveyed material as well as retaining lubricant within the space adjacent the outside of the cable 98. The periphery of the pan 102 of the bucket 101 is provided with a thickened or enlarged rim 111 to strengthen the bucket as well as to provide a wear portion therefor.

In order to compensate for stretch of the cable 98, the hubs 103 of certain of the buckets 101 at intervals along the cable 98 are provided with internally-threaded upper sockets 112 in place of the plain flared socket 106. Threaded into the threaded socket 112 is the threaded lower end 113 of a spacing sleeve 114 having spanner holes or sockets 115 therein for engagement by a conventional wrench or spanner. The portion 110 of the tubular cover 108 immediately above the spacing sleeve 114 is stretched over the upper end of the sleeve 114 rather than over the upper end of the bucket hub 103, as elsewhere. As the cable 98 stretches, the spacing sleeve 114 may be unscrewed by means of a spanner placed in the holes 115, and thereby moved outward away from the adjacent bucket hub 103, taking up the gap which would otherwise be created by the stretch of the cable 98. The upper end of the sleeve 114 is provided with a socket 116 adapted to receive the lower end of the adjacent spring 107.

The conveyor coupling 100 by which the conveyor unit 22 is connected into an endless path consists of upper and lower flared hollow conical coupling members 120 and 121 respectively (Figure 15) having internal conical sockets 122 and 123 for receiving the conical bulbous portions 99 on the ends of the cable 98. The bulbous portions 99 are formed by expanding the stranded ends of the cable 98 and casting filling metal therein to form a solid conical body, preferably with rounded ends 124. The conical portions 99 are of such configuration as to mate with the conical sockets 122 and 123. The upper coupling member 120 has at its upper end a flared socket 125 adapted to receive the lower end of the adjacent spring 107, and has the lower end portion 110 stretched thereover, as shown in the upper part of Figure 15. The lower end of the upper coupling member 120 is flanged as at 126 and is bolted as at 127 to the similarly flanged upper end portion 128 of the lower coupling member 121, with the bottom wall 129 of a slightly modified bucket 130 clamped between them by the bolts 127.

The modified bucket 130 is identical in construction with the regular buckets 101 but has the hub removed so as to leave a central hole or aperture 131 therein. A similarly modified bucket 130 is welded or otherwise secured to the lower end 132 of the lower coupling member 121, the said end 132 entering the aperture 131 of that particular bucket and joining it as by the welded junction 133. The lower coupling member 121 also has a flared socket 134 and flared counterbore 135 corresponding generally in shape and function to the flared socket 105 and counterbore 109 in the standard buckets 101, namely to receive the upper ends of the adjacent spring 107 and resilient tubular cover 109 respectively.

The modified bucket, generally designated 140 (Figure 19) is generally similar to the standard bucket 101, except that its bottom wall 141 is tapered or conical, and converges from its side wall 142 to the central portion 143 of its hub 144. The latter has a central bore 145 and upper and lower flared sockets 146 and 147 resembling those of the hub 103, and for the same purpose. The bucket 140 has the advantage of deflecting any conveyed materials falling upon it during its descending or return course.

The heavy duty bucket, generally designated 150 (Figures 17 and 18) is adapted for conveying materials under heavy duty conditions, and for this purpose it consists of a bucket support 151 and a conveyor pan 152 welded thereto as at 153. The conveyor support 151 roughly resembles an automobile steering wheel in that it is provided with a central hub 154, generally similar to the hub 144 of Figure 19 and similarly provided with a central bore 155 and upper and lower flared sockets 156 and 157 respectively. Extending radially outward from the central portion 158 of each hub 154 are spokes 159 forming a spider and terminating in a rim 160 of enlarged or thickened construction. The rim 160 on its lower side is provided with an annular recess or rabbet 161 which receives the upper edge portion 162 of the cup-shaped annular conveyor pan 152 and is united thereto as by welding. The pan 152 is provided with an upstanding central tubular portion 155 which is secured as by welding to the lower end of the hub 154. In this manner, the bucket-supporting portion 151 may be made of sufficiently heavy metal to stand the strain of conveying as well as to resist or sustain wear, whereas the pan 152 may be made of lighter metal of inferior wear-resisting characteristics since it is not called upon to frictionally engage anything other than the conveyed materials.

It will be understood that the endless bucket conveyor units and their components shown in Figures 15 to 19 inclusive may be used in any of the embodiments of the invention shown in the drawings thereof.

*Double driving wheel bucket conveyor*

The double driving wheel bucket conveyor installation, generally designated 170 (Figures 5 to 7 inclusive) is for the most part similar to the single driving wheel bucket conveyor 20 of Figures 1 to 4 inclusive, and similar parts are designated by the same reference numerals. It differs substantially only in its upper housing structure portion, generally designated 171, and the mechanism contained therein. The upper housing structure is roughly similar in construction in one respect to the lower housing structure 24 of Figure 1, as will be seen by a comparison of Figures 4 and 7 in that the conduit portions 72 and 73 are spaced laterally away from the side walls 76 and 77 by spacing wall portions 172 and 173 (Figure 7) welded respectively to the opposite edges 74 and 75 of the cutaway conduits 72 and 73. In the widened space thus provided within the upper housing portion 171 are mounted two conveyor supporting and driving wheels, generally designated 174 and 175 respectively, these wheels being similar in construction to the wheels 62 and 91 previously described and similarly provided with pneumatic tires 176 and 177 also of approximately toroidal shape. The wheels 174 and 175 are mounted side by side upon a squared central portion of a driveshaft 178 (Figure 6) to which they are drivingly connected. The shaft 178 is rotatably supported at its opposite ends in journal bearings 179 and 180 mounted on and bolted to the opposite side walls 76 and 77, and the shaft 178, like the shaft 86 of Figure 2, carries a retaining collar 181 and a sprocket 182 secured to its opposite ends. As before, the sprocket 182 is connected by a conventional drive chain to a motor or other power source by way of speed reduction mechanism (not shown). An endless flexible bucket conveyor unit 22, similar to that previously described in connection with Figures 1 to 4 inclusive, 15 to 19 inclusive, is trained over the pneumatic tires 176 and 177 of the double driving and supporting wheels 174 and 175 (Figure 6) so as to extend into the groove formed between the adjacent tires and to slightly indent the tires so as to form a driving engagement therebetween.

*Double wheel double pass driving wheel bucket conveyor*

The double wheel double pass driving wheel bucket conveyor installation, generally designated 200 (Figures 8 to 14 inclusive) is distinguished in one respect from the previous forms of the invention by the fact that the endless flexible bucket conveyor unit makes two passes at the discharge or unloading end of the apparatus so that carry-over of materials becomes negligible. The bucket conveyor 200 is mounted in a housing and conduit structure, generally designated 201, and including a lower housing structure 202, an upper housing structure 203 and forward and return conduit portions 204 and 205 respectively interconnecting the lower and upper housing structures 202 and 203.

The lower housing structure 202 (Figures 8, 11 and 13) is box-shaped with end walls 206 interconnecting side walls 207 and 208, the former being preferably welded in position and the latter bolted in position as at 209. A bottom 210 closes the lower end of the structure and the side wall 207 has an opening 211 near the bottom wall 210 to which is connected an intake or loading hopper 212 having a flared upper end portion 213, a vertical intermediate portion 214 and a downwardly-inclined lower portion 215 welded or otherwise secured to the side wall 207 at the entrance or intake opening 211. A damper 216 is slidably secured to the intermediate portion 214 by the bolt 217 and moves downwardly through an opening 218 into and across the lower hopper portion 215 so as to regulate the flow of materials into the intake opening 211. Journal bearings 219 are bolted or otherwise secured to the opposite side walls 207 and 208 and rotatably support the axle 220 for the lower conveyor supporting and guiding wheel 221. The latter is of similar construction to the wheels 62 and 91 already described in connection with Figure 2, and hence requires no further description.

The flexible bucket conveyor unit, generally designated 222, is similar in construction to the bucket conveyor unit 22 previously described, and consequently is similarly designated with reference numerals. It engages and slightly indents the pneumatic tire 223 also of approximately toroidal shape of the wheel 221. The endless flexible bucket conveyor unit 222 is trained through the conduits 204 and 205 leading from the lower housing structure 202 to the upper housing structure 203 and also serving as structural members to support the latter. The upper housing structure 203 is also box-shaped and includes a main portion 224 and an inverted box-like cover portion 225 bolted thereto as at 226. The main portion 224 has end walls 227 interconnected by side walls 228 welded or otherwise secured thereto, and has downwardly-inclined bottom walls 229 with conveyor openings 230 and 231 therein for the forward and return courses of the conveyor 222 out of the conduit 204 and into the conduit 205 respectively. Short conduit portions 232 and 233 connect the conduits 204 and 205 to openings 234 and 235 in the lower housing structure 202, whereas similar short conduit sections 236 and 237 connect the same conduit to the openings 230 and 231 in the upper housing structure 203. Connected to a central opening 238 in the bottom wall 229 is the upper end of a downwardly and laterally inclined material discharge spout 239 having an outlet opening 240.

Bolted or otherwise secured to the upper end of the main housing portion 224 are aligned journal bearings 241 which rotatably support a drive shaft 242 for twin conveyor driving and supporting wheels 243 and 244 equipped with pneumatic tires 245 and 246 and of similar construction to the wheels 62, 91, 174 and 175 already described. The wheels 243 and 244, however, are separated from one another by a partition 247 (Figure 9) and are drivingly connected to the shaft 242 by keying, splining or other suitable means. Drivingly secured to one end of the shaft 242 is a drive sprocket 248 which in turn is drivingly connected through a suitable drive chain (not shown) to a motor or other prime mover by way of conventional speed reduction mechanism (not shown).

Welded or otherwise secured to the bottom wall of the discharge hopper 239 (Figure 12) is a boss 249 which is bored for connection to an idler conveyor support 250 consisting of a fork or yoke 251 having a rod 252 extending downward through the boss 249 and having an adjusting nut 253 threaded upon the threaded lower end 254 thereof. The fork 250 has side arms 255 to the inner sides of which partitions or guides 256 are attached as by bolting or welding. Journaled in the upper ends of the arms 255 is the axle 257 of an idler wheel 258 rotatably supported thereon. The idler wheel 258 is similar in construction to the idler wheel 62 previously described and is similarly equipped with a pneumatic tire 259. The arms 255 of the fork 250 are connected to one another by a bridge portion 260 to which the rod 252 is attached, and the whole assembly 250 is swung sidewise at an angle to the side walls 228 in the manner shown in Figure 10.

The endless flexible bucket conveyor unit 222 is trained around the lower idler wheel 221, thence around one of the upper driving wheels 243 (Figure 14), thence downwardly around and under the idler wheel 258, thence upward and over the top of the driving wheel 244, and finally downward through the return conduit sections 237, 205 and 233 to the lower housing structure 202. The sections 205 and 237 being inclined as shown in Figure 14, permit free running of the conveyor unit 222.

*Operation*

The operation of the several forms of the bucket conveyor elevator shown in Figures 1 to 19 inclusive are generally similar to one another and will therefore be described in common. The single driving wheel bucket conveyor 20 of Figures 1 to 4 inclusive is operated by rotating the drive sprocket 89 by its power connection to the driving motor (not shown) and by supplying materials to be elevated and conveyed to the flared entrance 54 of the intake hopper 48. The flow of materials is regulated to a suitable rate by adjusting the damper 49 (Figure 2). The materials slide downward through the lower portion 51 of the hopper 48 into the bottom part of the lower conduit structure 24 whence they are scooped up by the buckets 101 of the endless flexible bucket conveyor unit 22 and carried upward through the conduit 26 into the upper conduit structure 25 and over the top of the driving and supporting wheel 91. As the buckets pass over the top of the latter, they discharge their contents by gravity, and the discharged materials flow down the inclined bottom walls 81 and outward through the inclined discharge spout 82 by way of the opening 80, and thenceforth disposed of in the desired manner. The spring 61 maintains the conveyor cable 98 at the desired tension, and the assembly including the yoke 66 and wheel 62 rides by gravity upon the lower course of the conveyor 22 to maintain it in the desired relationship.

The pneumatic tires 65 and 93 yield sufficiently to become indented so that the conveyor 22 is properly driven, and high speeds of travel and conveying are obtained because there is no intermeshing gearing or sprockets for the conveyor 22, and stretching of the cable 98 thereby has no influence upon the proper operation of the conveyor. If the particular installation is of such a nature that carryover of materials would be detrimental, the buckets 140 shown in Figure 19 are substituted, the conical bottoms 141 thereof deflecting the materials falling upon them as the conveyor 22 is descending, so that the materials are properly deposited on the bottom wall 81 and thence are carried out through the hopper or spout 82.

The conveyor 170 of Figures 5 to 7 inclusive operates in a similar manner except that a greater purchase is obtained upon the buckets of the conveyor 22 by their engagement with the two driving wheels 174 and 175 (Figure 6), the indentation of both pneumatic tires 176 and 177 giving greater driving engagement and consequently less slippage as well as greater freedom from vibration.

The operation of the heavy duty double pass conveyor 200 of Figures 8 to 14 inclusive is also similar to the operation of the light duty conveyor 20 or the medium duty conveyor 170, except that the tension of the conveyor 222 is more accurately regulated. Moreover, since the conveyor makes two separate passes while it is within the upper conduit structure 203, materials which might have adhered to the buckets or accumulated on the inverted bottoms of the buckets during the first pass are effectively discharged during the second pass, as the conveyor again proceeds upward toward the driving wheel 244 and before passing downward into the conduit portions 237, 205 and 233.

*Resiliently-rimmed wheel-driven flight conveyors*

Figures 20 to 24 inclusive show the foregoing invention as applied to resilient-rimmed wheel-driven flight conveyors of various types. The endless flexible conveyor installation, generally designated 300, of Figures 20 and 21 includes a housing and conduit structure, generally designated 301, which may be mounted either horizontally or vertically. If vertical, the arrangement would resemble that shown in Figures 1 to 14 inclusive, whereas Figure 20 shows a horizantal installation. The structure 301 includes longitudinally-spaced housings 302 and 303 respectively interconnected by laterally-spaced conduits 304 and 305. An intake or supply hopper 306 is mounted in one of the conduits 304 or 305, depending upon the particular installation, Figure 20 showing the hopper 306 mounted in an opening 307 in the upper conduit 304. The intake or supply hopper 306 may, if desired, be located in the lower conduit 305 and is so indicated in dotted lines at 306' in Figure 20.

Journaled in the housings 302 and 303 as at 308 and 309 respectively are shafts 310 and 311 carrying resilient-rimmed supporting and driving wheels, generally designated 312 and 313 respectively. The wheels 312 and 313 are of similar construction to the wheels 23 and 92 of Figure 1, hence no additional description is necessary and corresponding parts are similarly designated. The supporting wheel 312 has the bearing blocks or journal bearings 308 slidably or reciprocably mounted in parallel guides 314, the bearings 308 being carried by a fork or yoke 315 having a rod 316 projecting through the housing 302 and encircled by a compression spring 317 disposed between the housing 302 and a head 318 on the shaft 316. This construction is similar in purpose and operation to that shown in the lower part of Figure 2, by providing a resilient automatic takeup of slack in the endless flexible conveyor unit, generally designated 320, which encircles approximately half the circumference of each of the wheels 312 and 313 and engages the tires 65 and 93 thereof.

The endless flexible conveyor unit 320 may be of any suitable type such as, for example, the type shown in the Hapman Patent 2,607,469 of August 19, 1952, for Flight Conveyor. Briefly described, this conveyor unit consists generally of an endless sprocket chain 321 carrying longitudinally-spaced flights 322. The chain 321 has paired inner and outer links 323 and 324 respectively pivoted to one another by pivot pins 325. Also pivoted to the pivot pins 325 are bent arms 326 of semi-circular clamping plates 327 which are loosely bolted as at 328 to similar but oppositely-facing clamping plates 329 on the opposite sides of flights 330 of suitable material, such as natural or synthetic rubber or plastic or metal, depending upon the installation. The bolts 328 pass through enlarged holes in the flights 330 and the links of the chain 321 are sealed by resilient gaskets, as set forth in detail in the Hapman Patent 2,607,469.

The installation, generally designated 340, shown in Figure 22, closely resembles that of Figures 20 and 21, except that a cable-mounted endless flexible flight conveyor unit, generally designated 341, is employed in place of the chain-mounted conveyor unit 320. The remaining parts are of the same construction and hence are designated with similar reference numerals. The flight conveyor 341 is of any suitable type, such as, for example, the type shown in Hapman Patent 2,555,338 of June 5, 1951, for Conveyor Element Structure, reference to which patent is hereby made for a detailed description. It is sufficient for the present purpose to state that the cable-mounted flight conveyor unit 341 includes a cable 342 of any suitable flexible material, such as twisted stranded metal wire cable upon which are threaded paired flight-clamping discs 343, each pair being separated from an adjacent pair by tubular spacers 344 of flexible material, such as natural or synthetic rubber. Disposed between each pair of clamping discs 343 is a flight disc 345 of any suitable material, such as natural or synthetic rubber, plastic or metal, the assembly consisting of the clamping discs 343 and flight discs 345 constituting a flight generally designated 346.

The installation, generally designated 350, shown in Figure 23, also follows the same principle as that shown in Figures 20 and 21, and similar parts are therefore similarly designated. The installation 350, however, includes an endless flexible flight conveyor unit 351 comprising an endless flexible chain 352 having articulated links 353 pivotally connected to one another. The links have integral wings or lugs 354 projecting laterally therefrom and secured as by the fasteners 355 to these lugs 354 are plate-shaped flights 356 of sheet metal, natural or synthetic rubber, plastic or the like.

The installation, generally designated 360, shown in Figure 24, is closely similar to that shown in Figure 23 and similar parts bear similar reference numerals. In Figure 24, however, the endless flexible flight conveyor unit 361 consists of an articulated link chain 362 wherein the plate-shaped flights 363 project laterally from and are integral with the links 364 of the chain 362.

The operation of the forms of the invention shown in Figures 20 to 24 inclusive are generally similar to one another and hence may also be described in common. Power is applied to the shaft 311 through the sprocket wheel 86 (Figure 21) from a conventional driving motor (not shown) through a likewise conventional speed reduction unit (also not shown), causing the driving wheel 313 to be driven at the desired speed. Rotation of the driving wheel 313 and its tire 93 causes the endless flexible conveyor unit 320 to travel in an orbital path, the engagement therebetween being cushioned by the resilience of the tire 93 and the air within it, if the tire 93 is a pneumatic tire. As the flights 330, 346, 356 or 363 move through the conduit 304, they engage the material dropping through the supply hopper 306 and push it through the conduit 304 into the discharge housing 303, whence it tumbles downward through the outlet hopper or spout 331 into a suitable receiver (not shown).

The flights 330 continue downward around the periphery of the driving wheel 313 and, after dropping all of the conveyed material, enter and pass through the conduit 305, and then pass upward around the periphery of the supporting wheel 312, thereafter reentering the conduit 304, completing the cycle. Meanwhile, the spring 317 urges the fork 315 to the right (Figure 20) and automatically takes up slack in the conveyor unit 320. The conveyor continues to operate as long as power is applied to the sprocket 89, and material continues to be conveyed as long as it is supplied to the hopper 306 during the period of operation of the conveyor.

The tires employed in the various forms of the present conveying apparatus are of approximately toroidal shape which, according to the dictionary definition, is a surface generated by the rotation of a plane closed curve about an axis lying in its plane. The same geometrical shape is also sometimes called a torus, a tore or an anchor ring.

What I claim is:

1. A conveying apparatus comprising a conveyor supporting structure, a plurality of conveyor supporting wheels rotatably mounted in said structure for rotation upon spaced parallel first and second axes, said wheels including first and second wheels rotatably mounted side by side on said first axis and a third wheel rotatably mounted on said second axis; and a fourth wheel rotatably mounted on a third axis intermediate said first and second axes, an approximately toroidal resilient tire mounted on the periphery of each of said wheels, an endless flexible conveyor disposed in an orbital path at least partially encircling the peripheries of the tires on said wheels, said conveyor including an endless flexible connector having a multiplicity of material-conveying elements mounted transversely thereon at closely-spaced intervals therealong and in indenting engagement directly with said tires throughout at least one quarter of the circumference of each tire, and conveyor driving mechanism operatively connected to one of the tire-equipped wheels for rotating said one wheel whereby to move said conveyor through said orbital path, said structure including conveyor-engaging guiding and retaining members disposed on opposite sides of said wheels in close proximity to the opposite sides of said conveyor.

2. A conveying apparatus comprising a conveyor supporting structure, a pair of conveyor driving wheels rotatably mounted in said structure in side-by-side coaxial relationship, an approximately toroidal resilient tire mounted on the periphery of each wheel, an endless flexible conveyor disposed in an orbital path at least partially encircling said wheels in the space between said tires, said conveyor including an endless flexible connector having a multiplicity of material-conveying elements mounted transversely thereon at closely-spaced intervals therealong and drivingly engageable directly with said tire, mechanism operatively connected to said tire-equipped wheels for rotating said wheels whereby to move said conveyor through said orbital path, and a third wheel rotatably mounted on said structure in spaced relationship to said side-by-side wheels, said third wheel supportingly engaging a portion of said conveyor.

3. A conveying apparatus comprising a conveyor supporting structure, a pair of conveyor driving wheels rotatably mounted in said structure in side-by-side coaxial relationship, an approximately toroidal resilient tire mounted on the periphery of each wheel, a conveyor supporting wheel rotatably mounted in said structure remote from said driving wheels, a skew wheel rotatably mounted in said structure between said driving wheels and said supporting wheel, said skew wheel having its axis of rotation disposed at acute angles to the axis of rotation of said driving wheels, an endless flexible conveyor trained around said supporting wheel and around each driving wheel and also around said skew wheel, said conveyor including an endless flexible connector having a multiplicity of material-conveying elements mounted transversely thereon at spaced intervals therealong and drivingly engageable directly with said tires, and mechanism operatively connected to said driving wheels for rotating said driving wheels.

4. A conveying apparatus comprising a vertically-directed conveyor supporting structure, a pair of conveyor driving wheels rotatably mounted in the upper portion of said structure in side-by-side coaxial relationship, an approximately toroidal resilient tire mounted on the periphery of each wheel, a conveyor supporting wheel rotatably mounted in the lower portion of said structure remote from said driving wheels, a skew wheel rotatably mounted in the intermediate portion of said structure between said driving wheels and said supporting wheel, said skew wheel having its axis of rotation disposed at acute angles to the axis of rotation of said driving wheels, an endless flexible conveyor trained around said supporting wheel and then around one of said driving wheels and next around said skew wheel and finally around the other driving wheel and thereafter returning to said supporting wheel, said conveyor including an endless flexible connector having a multiplicity of material-conveying elements mounted transversely thereon at spaced intervals therealong and drivingly engageable directly with said tires, and mechanism operatively connected to said driving wheels for rotating said driving wheels.

5. A conveying apparatus comprising a vertically-directed conveyor supporting structure, a pair of conveyor driving wheels rotatably mounted in the upper portion of said structure in side-by-side coaxial relationship, an annular resilient tire mounted on the periphery of each wheel, a conveyor supporting wheel rotatably mounted in the lower portion of said structure remote from said driving wheels, a skew wheel rotatably mounted in the intermediate portion of said structure between said driving wheels and said supporting wheel, said skew wheel having its axis of rotation disposed at acute angles to the axis of rotation of said driving wheels, an endless flexible conveyor trained around said supporting wheel and then around one of said driving wheels and next around said skew wheel and finally around the other driving wheel and thereafter returning to said supporting wheel, said conveyor including an endless flexible connector having a multiplicity of cupped material-conveying buckets mounted transversely thereon at spaced intervals therealong and drivingly engageable directly with said tires, and mechanism operatively connected to said driving wheel for rotating said driving wheels.

References Cited in the file of this patent

UNITED STATES PATENTS

| | | |
|---|---|---|
| 2,007,910 | Stephens | July 9, 1935 |
| 2,326,535 | Hapman | Aug. 10, 1943 |
| 2,357,651 | Hapman | Sept. 5, 1944 |